United States Patent [19]
Hankel

[11] 3,914,820
[45] Oct. 28, 1975

[54] VACUUM GRILL BLOCK

[76] Inventor: Robert William Hankel, 7135 W. 29th Place, Denver, Colo. 80215

[22] Filed: Dec. 9, 1974

[21] Appl. No.: 530,665

Related U.S. Application Data

[63] Continuation-in-part of Ser. No. 338,319, March 5, 1973, abandoned.

[52] U.S. Cl. .................... 15/344; 15/352; 15/381
[51] Int. Cl.² .......................................... A47L 5/26
[58] Field of Search ............ 15/93 R, 344, 381, 380, 15/385, 22 A, 352

[56] References Cited
UNITED STATES PATENTS

| | | | |
|---|---|---|---|
| 2,447,172 | 8/1948 | Gordon | 15/381 X |
| 2,588,000 | 3/1952 | Hines | 15/344 X |
| 2,676,347 | 4/1954 | Hershey | 15/22 A |
| 2,926,370 | 3/1960 | Wessel | 15/380 X |
| 3,231,917 | 2/1966 | Reed | 15/330 X |
| 3,380,093 | 4/1968 | Hill | 15/93 R X |

*Primary Examiner*—Billy J. Wilhite
*Assistant Examiner*—C. K. Moore
*Attorney, Agent, or Firm*—Bertha L. MacGregor

[57] ABSTRACT

A self-contained portable vacuum grill cleaning device is disclosed herein. It comprises battery powered motor driven means for removing residues such as carbon, grease, etc., on grills, frying and other surfaces in restaurants and other food preparation establishments; the removal being effected by loosening of the residues by high speed oscillatory action of certain mechanism in the device and collection of the loosened residue by vacuum for deposit in a slidable drawer which is easily removable, emptied, cleaned and replaced in the device.

5 Claims, 5 Drawing Figures

3,914,820

VACUUM GRILL BLOCK

This application is a continuation-in-part of my copending application Ser. No. 338,319, filed Mar. 5, 1973 and now abandoned.

This invention relates to a vacuum grill cleaning device which is compact and self-contained, designed to remove residues from cooking surfaces such as grills, frying and other surfaces in restaurants and other food preparation establishments. The grill block provides means for efficiently removing such residues and collecting them in a slidable drawer easily removable for emptying and cleaning, and readily replaceable in the device.

The main object of the invention is to provide a cleaning device which is efficient for frequent use in maintaining cleanliness of cooking surfaces which are in continuous use for many hours in restaurants and the like. The compactness and portability of the device, and the collection of loosened residues in a rigidly constructed container which is easily removed, emptied, cleaned and replaced in the device, all tend to encourage use of the vacuum grill cleaner of this invention as frequently as required for absolute cleanliness.

Another object of the invention is to provide an inverted funnel shaped collector which has a relatively large intake end and a centrally located reduced outlet elbow communicating with an impeller which has a discharge end located above the collection container, the latter being slidable for removal and replacement in the housing of the device.

Another object is to provide exceptionally simple oscillatory and reciprocatory means for loosening residues from a surface preparatory to suctionally drawing the residues into the collection funnel.

Figure 1:
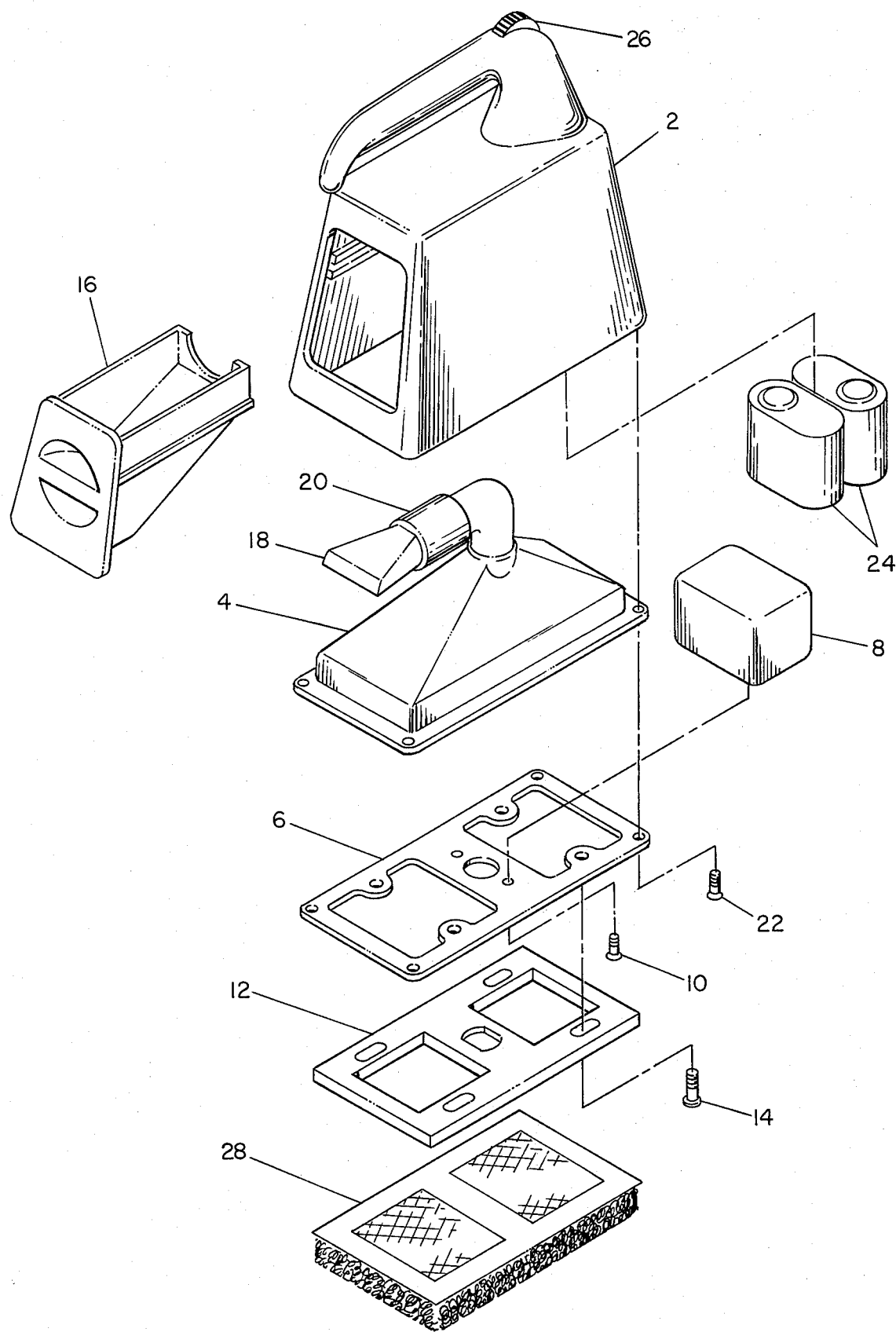
FIG. 1 is a three dimensional, disassembled view of the vacuum cleaning device of my invention.
Figure 3:
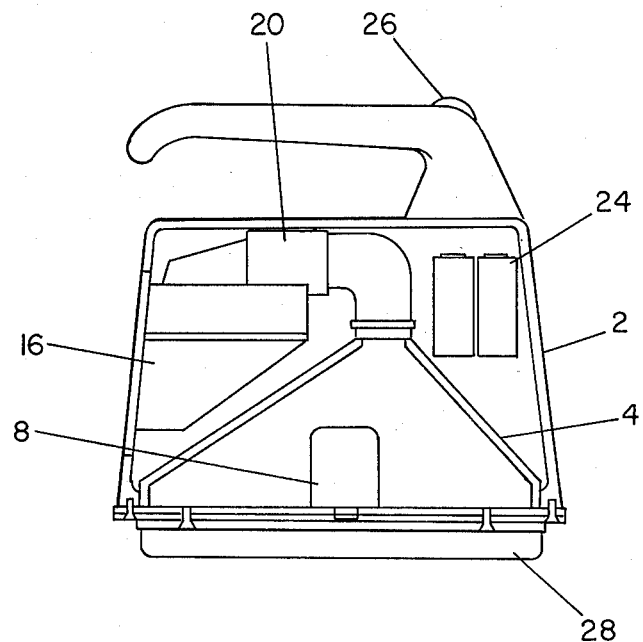
FIG. 3 is a vertical sectional view, partly in elevation.
Figure 2:
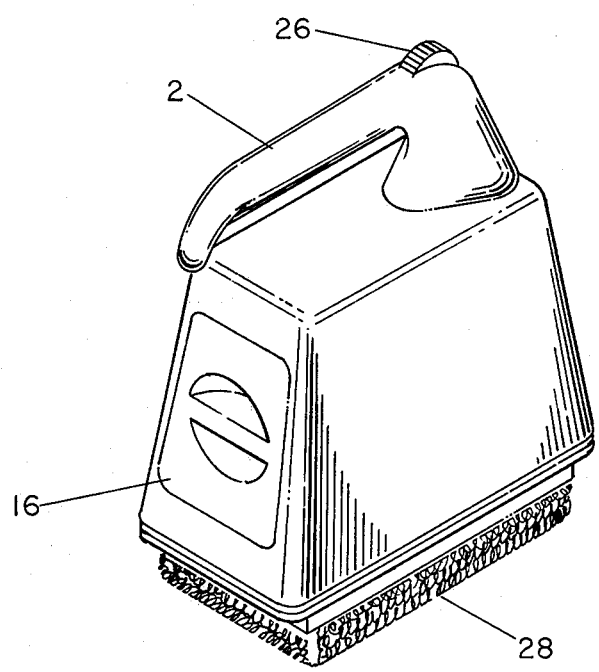
FIG. 2 is an isometric view of the device.
Figure 4:
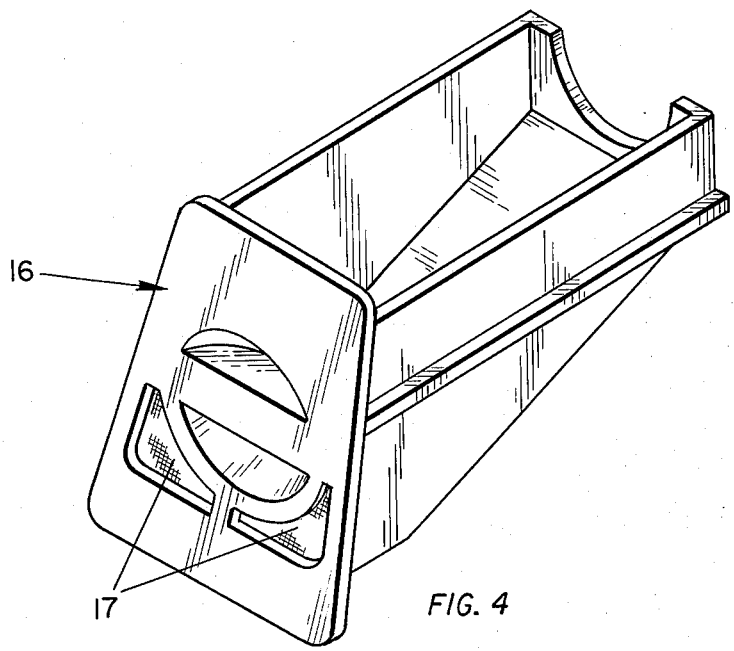
FIG. 4 is an isometric view, on an enlarged scale, showing the rigid collection container removed from its compartment in the device of the invention.
Figure 5:
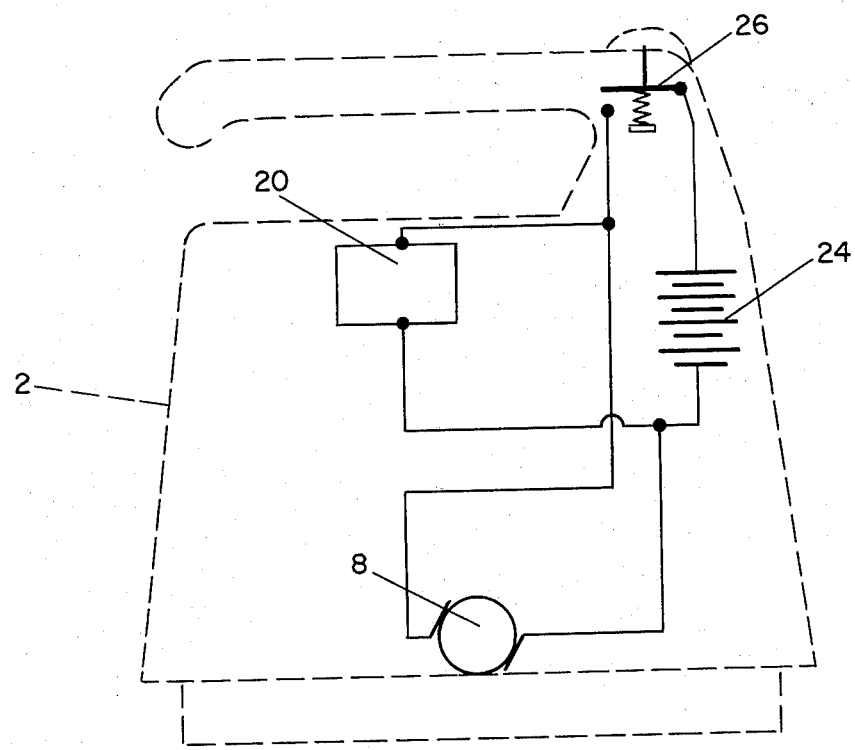
FIG. 5 is a diagrammatic view showing the motor, switch, batteries and impeller, and electrical wiring connecting same.

In the embodiment of the invention shown in the drawings, the vacuum grill cleaning device consists of a truncated pyramidal shaped housing 2 having a flat horizontal top wall surface, trapezoidal diverging side walls, and an open bottom end. A handle is affixed to the housing top and projects upwardly and rearwardly from a front portion thereof in a manner overlying the top wall surface. A hollow compartment is defined interiorly of the housing 2 and opens out of the bottom thereof to provide access thereto. A generally rectangularly shaped aperture is defined integrally in the rear end wall surface of the housing and opens into the housing interior compartment.

A collection funnel 4 having a rectangular inlet end converging to a circular discharge end has a flange disposed completely about the inlet end and projecting outwardly therefrom and adapted to engage the bottom edge of the side and end walls of the housing to secure the collection funnel 4 in position therein with the inlet end of the funnel projecting outwardly of the bottom of the housing.

A plurality of screws 22 are provided in association with openings disposed in the corners of the flange of the collection funnel 4 to secure the flange and funnel to the housing 2.

A battery powered vacuum impeller 20 is provided having an inlet end and an outlet end, the inlet end being connected by a suitable elbow to the discharge end of the collection funnel 4. The outlet end of the battery powered vacuum impeller 20 is connected to the inlet end of a discharge nozzle 18 which is also provided with an outlet end.

A pair of parallel horizontal tracks spaced apart from each other are provided on opposed interior surfaces of opposite housing side wall surfaces of the housing compartment leading from the rear end wall aperture to a position adjacent the interior of the front end wall of the housing 2.

A collecting drawer 16 consists of side walls, a front wall, a back wall, a bottom surface, and a screened vent 17 in the drawer front wall to place the drawer compartment in communication with the atmosphere through the front door in a conventional well known manner. A pair of parallel transversely spaced apart runners are disposed on the drawer side walls, one runner on each side wall, with the runners adapted to engage the tracks in the housing compartment for reciprocal guiding sliding movement of the drawer thereon between a closed position where the drawer is fully received in the housing compartment with the drawer front surface closing the housing rear end wall aperture, and an open position where the drawer 16 may be removed from the housing for purpose of emptying the drawer.

The discharge end of the nozzle 18 is disposed in a position above the drawer when the drawer is in the operative closed position so that material discharged from the funnel 4 through the vacuum impeller 20 will be discharged into the drawer compartment.

A flat rectangularly shaped base mounting plate 6 is disposed in underlying juxtaposition with the bottom surface of the collection funnel flange 4 and secured thereto by means of the screws 22. The base mounting plate 6 is provided with a central opening extending therethrough and also has a pair of identical rectangularly shaped openings disposed equal distant on each side of the central opening and occupying the major area of the base plate on each side of the central opening.

A flat rectangularly shaped oscillating plate 12 is disposed in underlying juxtaposition with the bottom surface of the base mounting plate 6, the oscillating plate having a plurality of longitudinally elongaged slots extending along opposite side edges thereof and a central opening disposed centrally thereof and being of a general rectangular configuration and including a pair of arcuate opposed side edges and a pair of opposite opposed flat edges. A pair of rectangularly shaped openings are each disposed an equal distance on opposite sides of the central opening of the oscillating plate 12 with each disposed in axial alignment with the associated rectangular openings of the base mounting plate 6 when the oscillating plate is disposed in vertical alignment therewith, and in this position, the oscillating plate central opening is in substantial axial alignment with the base plate central opening.

A plurality of bolts 14 are provided, each associated with one of the slots of the oscillating plate 12 and passing loosely therethrough to be threadedly received in associated threaded openings of the base mounting plate 6 for guidingly mounting the oscillating plate to the base plate in a manner permitting oscillatory reciprocal movement of the oscillating plate 12 relative to the base plate 6.

An oscillating electric motor 8 is mounted by screws 10 to the top surface of the base mounting plate 6 inwardly of the inlet end of the collection funnel 4 and having its motor shaft projecting downwardly through the central opening of the base mounting plate 6 and into the central opening of the oscillating plate 12. The motor shaft is eccentric so that rotation thereof will alternatively engage opposite flat side edges of the central opening of the oscillating plate 12 to effect the oscillatory reciprocal movement of the oscillating plate 12 relative to the base mounting plate 6 as guided by bolts 14.

The oscillating motor 8 is powered by suitable rechargeable batteries 24 carried in the housing in a position above the collection funnel 4. The batteries 24 are connected by suitable electrical wiring to the oscillating motor 8, there being interposed an electrical switch 26 which is mounted in the handle of the housing 2 and which is selectively operable between an "on" and "off" position in a well known manner, the switch when in the "on" position completing the circuit between the batteries and the motor to energize the motor, and the switch when in the "off" position breaking the circuit between the batteries and the motor to de-energize the motor.

A rectangularly shaped mesh pad 28 is provided having a flat top surface and an open mesh bottom surface, the top surface including a pair of rectangular openings disposed equal distance on opposite sides of the central transverse axis of the pad and in axial alignment with respective rectangular openings of the oscillating plate 12 and base mounting plate 6. The mesh pad is secured to the oscillating plate 12 in any suitable manner, such as by pressure sensitive adhesive, bolts, and the like so as to be disposed in underlying juxtaposition with the bottom surface of the oscillating plate for simultaneous movement therewith.

In operation, energization of the motor 8 by batteries 24 and switch 26 effects oscillation of the oscillating plate 12 and affixed mesh pad 28 along with the simultaneous energization of the vacuum impeller motor 20 which is connected in electrical parallel relationship with the oscillating motor 8 and energized by battery 24 to effect the drawing of air through the mesh pad 28 and oscillating plate 12 and base mounting plate 6 into the collection funnel 4 from whence it is discharged through the vacuum impeller 20 and discharge nozzle 18 into the compartment of collecting drawer 16 from whence the air passes out of the door vent 17 in the conventional manner with the residue carried thereby being deposited into the compartment of the drawer 16 for later disposal.

I claim:
1. A vacuum cleaning device comprising
   a. a housing having top, side and end walls and an open bottom,
   b. a compartment defined interiorly of the housing communicating with the open bottom,
   c. a drawer opening in the housing providing access to the interior compartment,
   d. a collection funnel having a flanged inlet end engaging the bottom edges of the housing side and end walls, and walls converging upwardly to a discharge end,
   e. a motor-driven vacuum impeller connected to the discharge end of the collection funnel and having a discharge nozzle extending into the housing interior compartment,
   f. an open top residue collecting drawer having a screened vented front wall,
   g. cooperating track means on the drawer and housing permitting sliding movement of the drawer in the drawer opening, the impeller nozzle extending over the open top of the drawer when the drawer is in a closed position in the housing,
   h. an apertured base mounting plate underlying and attached to the flanged inlet end of the collection funnel,
   i. an apertured oscillating plate underlying the base mounting plate and connected thereto by means which permit oscillatory reciprocal movement of the oscillating plate relatively to the base plate,
   j. an oscillating motor mounted on the base plate inwardly of the collection funnel, with the motor shaft projecting downwardly through the apertured base plate into an aperture of the oscillating plate,
   k. a mesh pad affixed to the oscillating plate, and
   l. rechargeable batteries operatively wired to the oscillating motor and to the impeller motor to actuate the oscillating plate and pad to loosen residue on a surface and to suctionally collect the loosened residue and deposit it in said drawer.

2. The cleaning device defined by claim 1, which includes a handle mounted on the top wall of the housing and extending longitudinally and horizontally of the top in a position spaced from said top.

3. The cleaning device defined by claim 2, which includes a switch mounted in said handle.

4. The cleaning device defined by claim 1, in which the means which connect the oscillating plate to the base plate consist of a plurality of elongated slots in the oscillating plate, a plurality of smaller apertures in the base plate, and headed bolts extending upwardly through one of each of said elongated slots and apertures.

5. The cleaning device defined by claim 1, in which the aperture in the oscillating plate engaged by the motor shaft is a central opening which is coaxial with a central aperture in the base plate.

* * * * *